United States Patent [19]

Bolang et al.

[11] 4,088,039

[45] May 9, 1978

[54] RATIO CHANGING MECHANISM

[75] Inventors: Per Axel Bolang, Bellevue; Alan Bartholomew Cairns Dawson, Mercer Island, both of Wash.

[73] Assignee: The Boeing Company, Seattle, Wash.

[21] Appl. No.: 768,341

[22] Filed: Feb. 14, 1977

[51] Int. Cl.² .............................................. G05G 1/04
[52] U.S. Cl. ....................................... 74/479; 74/518; 74/522; 244/83 H
[58] Field of Search ...................... 74/479, 480 R, 516, 74/518, 522, 522.5, 559; 244/83 H

[56] References Cited

U.S. PATENT DOCUMENTS

| 2,625,349 | 1/1953 | Speer | 244/230 |
|---|---|---|---|
| 3,101,821 | 8/1963 | Henry | 74/479 X |
| 3,138,349 | 6/1964 | Piasecki | 74/559 X |
| 3,168,265 | 2/1965 | Pfaff | 74/479 X |
| 3,618,419 | 11/1971 | Maroshick | 244/230 X |

FOREIGN PATENT DOCUMENTS 1,165,627  10/1958  France ................... 74/479

Primary Examiner—Gary L. Smith
Attorney, Agent, or Firm—Thomas H. Murray

[57] ABSTRACT

A ratio changing mechanism is provided for combining two mechanical input signals to produce an output signal. The mechanism includes a first crank mounted on a pivoted link with an input member mounted on the first crank. The mechanical inputs are applied to the input member which moves the crank in such a manner that an output signal is transmitted from one arm of the crank. Movement of the first crank is modified by connection of the other crank arm to a second crank which is adjustable in position to change the ratio of the output to the combined input signals.

5 Claims, 6 Drawing Figures

RATIO CHANGING MECHANISM

BACKGROUND OF THE INVENTION

The present invention relates to a mechanism for combining two or more mechanical input signals to provide an output signal, with means for changing the ratio of the output signal to the input signals, the range of adjustment extending down to zero output or lockout.

The mechanism of the present invention is particularly intended for use in aircraft control systems for actuating control surfaces, although its usefulness is not necessarily limited to this particular application. In some aircraft, particularly those designed for short take-off and landing (STOL) operation, the aircraft lands and takes off at very low speed but cruises at relatively high speed. Such aircraft are often equipped with inboard and outboard elevator control surfaces, but because of the great difference in speed under different flight conditions, the aircraft would be oversensitive in the pitch axis at cruise speeds if the same large elevator deflections were used at high speed as are required for low speed landing and takeoff conditions. For this reason, the outboard elevator angular travel must be gradually decreased as the air speed increases, and should reach a locked position at a predetermined relatively high speed. The outboard elevators receive control inputs from two sources, that is, from the inboard elevators which are directly controlled by the pilot, and from a series electric command servo which is part of the stability augmentation system. A control system for the outboard elevators, therefore, must provide for combining these two input signals to provide a single output signal for operating the elevator, and must include means for changing the ratio so that as the air speed increases the ratio of output-to-input signals is decreased and reaches a zero output or lockout position at a predetermined speed. Ratio changing mechanisms have, of course, been known heretofore but no such mechanism has been available which combines all the features which are necessary or desirable for a mechanism intended for use in an aircraft control system as described.

SUMMARY OF THE INVENTION

In accordance with the present invention, a ratio changing mechanism is provided for combining two mechanical input signals to provide a single mechanical output signal, with a continuously adjustable ratio of output-to-input signals extending down to a zero or lockout position, and which can, if desired, be designed to also provide a negative ratio. The mechanism provides smooth, nearly straight-line ratio adjustment over the full range, and the ratio can be adjusted when the input is zero without causing any output signal. The input and output signals may be generally parallel to each other, and the inputs can be differential or cumulative.

These results are obtained by a relatively simple mechanism which includes a link pivotally mounted on one end and carrying a first crank member pivotally mounted on the other end. An input member in the form of a second link is mounted at the pivot point of the crank member and the two input signals are applied to this input member. Application of the input signals, therefore, causes the crank member to be moved by rotation of the first-mentioned link about its pivot and an output signal is taken from one arm of the crank member. A second crank member is connected to the other arm of the first crank member by a pivotally-attached link, and the ratio of output-to-input signals is adjusted by movement of the second crank member about its pivot, which has the effect of restraining or modifying the movement of the first crank member to control the magnitude of the output signal. The arrangement is such that the second crank can be moved to a position in which output signals from the first crank member are reduced to zero, for any input, so that a lockout position is provided. A ratio changing mechanism is thus provided which is relatively simple but which has all the desirable features mentioned above.

BRIEF DESCRIPTION OF THE DRAWINGS

The invention will be more fully understood from the following detailed description, taken in connection with the accompanying drawing, in which.

DESCRIPTION OF THE PREFERRED EMBODIMENT

Figure 1:
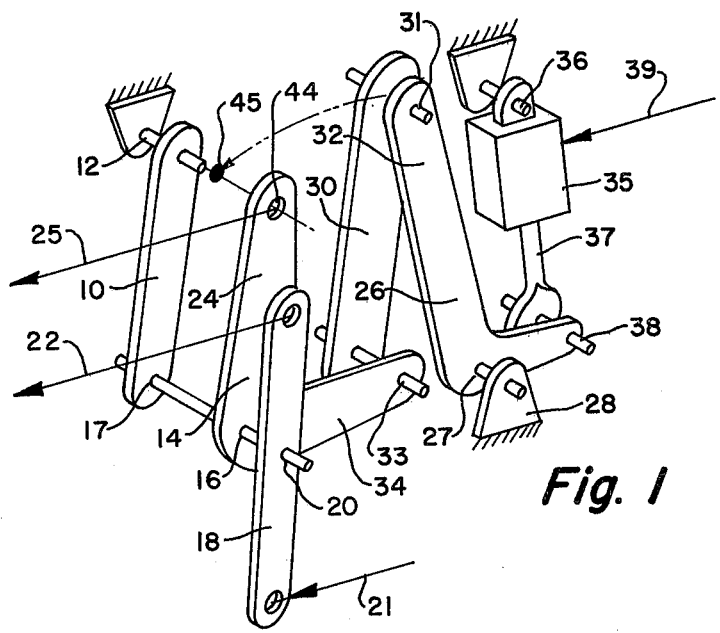
FIG. 1 is a somewhat diagrammatic perspective view of a ratio changing mechanism embodying the invention.

An illustrative embodiment of the invention is shown in the drawing which is particularly suitable for use in a control system for the outboard elevators of an STOL aircraft, as discussed above, although the invention is not necessarily limited to this particular use but is applicable to any control or mechanical system where two inputs must be combined and provision made for changing the ratio of output-to-input signals.

As shown somewhat diagrammatically in FIG. 1, the ratio changing mechanism includes a first link 10 which is pivoted at one end on a fixed support 12, the other end being free to rotate about the pivot 12. A first bell crank 14 is provided having a pivot point 16 and two angularly-related arms. The crank 14 is carried on the link 10, and its pivot point 16 is pivotally mounted on the free end of the link 10 at 17.

A second link 18 is provided which serves as the input member. The link 18 is pivotally mounted at 20 on the pivot point 16 of the crank 14 and mechanical input signals are applied to the link 18 in any suitable manner. Preferably, as illustrated in FIG. 1, one input, which may be derived from the inboard elevator of the aircraft, is applied to the lower end of the link 18 as indicated by the arrow 21, while the other input signal which may be derived from the stability system is applied to the other end as indicated by the arrow 22. In the illustrative embodiment, the link 18 is mounted on the crank 14 at its midpoint and the two input signals are applied at opposite ends of the link. The signals are thus combined and applied to the crank 14 through the pivotal mounting 20 of the link 18. It will be understood, of course, that the link 18 could be mounted so that the pivot 20 is at some point other than the midpoint, to change the relative effect of the two signals, or it could be arranged so that the signals are applied differentially rather than cumulatively as shown. It will also be understood that more than two input signals could be applied to the link 18.

When the two input signals are applied to the link 18 as shown by the arrows 21 and 22, the link is moved in the direction of the arrows by the combined effect of the input signals and moves the crank 14 which pivots about its mounting 17 on the link 10, the link 10 pivoting as necessary about its fixed pivot 12. The vertical arm 24 of the crank 14 thus moves laterally, in the same direction as the link 18, and an output signal indicated by the arrow 25 can be transmitted from the arm 24 in a direction generally parallel to the input signals.

The ratio adjusting means operates by modifying or restricting the movement of the crank 14 to adjust the magnitude of the output signal. For this purpose, a second bell crank 26 is provided with its pivot point 27 pivotally mounted on a fixed support 28. A third link 30 is pivotally connected at 31 to the vertical arm 32 of the crank 26, while the other end of the link 30 is pivotally connected at 33 to the horizontal arm 34 of the first crank 14. Adjustment of the ratio of output-to-input signals is effected by changing the position of the crank 26. This may be done in any desired manner but in the illustrated embodiment a servoactuator 35 is provided which is pivotally mounted at 36 and which has a retractable piston 37 connected to the crank 26 at 38. The servoactuator 35 may be controlled in any desired manner or in response to any desired quantity, such as the air speed of an airplane, a signal being applied to the servo from any suitable control or sensing system as indicated by the arrow 39.

Figure 2:
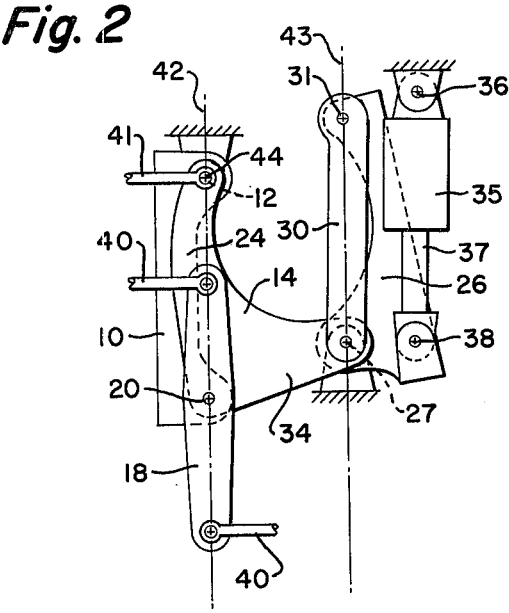
FIGS. 2-5 are elevational views of an actual embodiment of the mechanism of FIG. 1 showing different operating positions of the mechanism.

The operation of this mechanism is illustrated in FIGS. 2-5 which show different operating positions of an actual embodiment of the invention. Referring first to FIG. 2, the mechanism is illustrated with the servo 35 in its fully-extended position to provide the maximum ratio which is 1.0 in the position shown, although higher ratios can be attained if desired. Input signals may be applied to the link 18, as previously described, by means of rods or links 40 attached to appropriate points on the link 18, zero input being shown in FIG. 2. The output signal is applied by the crank 14 to a rod 41 pivoted at 44 at the upper end of crank arm 24, for transmission to the control surface to be actuated, or for any desired purpose. In the position of FIG. 2, with zero net input and with the servo 35 set for a ratio of 1.0, the members of the mechanism are in the position shown. That is, the arm 24 of the crank 14 is in a vertical position aligned with a vertical axis 42 passing through the pivot 12 corresponding to zero output and the link 18 is in a vertical or near vertical position. The crank 26 is in the position shown such that the link 30 is in a vertical position aligned with the vertical axis 43 through the pivot 27.

Figure 3:
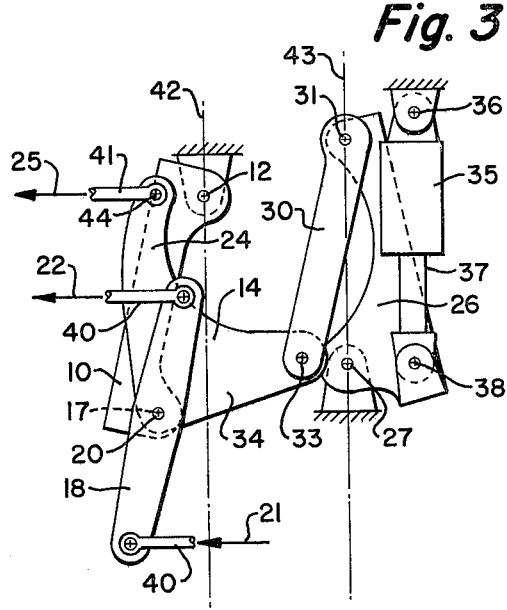

If now a net force is applied to the link 18 by the combined input signals, as in FIG. 3, the parts assume the position there shown. That is, the link 18 moves to the left causing the link 10 to rotate about the pivot 12 carrying the crank 14 with it. Movement of the crank 14, however, is controlled and restricted by the link 30 which rotates about its upper pivot 31 and causes the crank 14 to rotate about its pivot 17, relative to the link 10, to the position shown. The upper end 44 of the crank arm 24 thus moves to the left from the vertical axis 42 to provide the output signal in a direction generally parallel to that of the input signals. Since the servo is set for a ratio of 1.0, the movement of the point 44 is equal to the combined input signal. That is, the displacement of the end of the point 44 from the vertical axis 42 is equal to the displacement of the pivot 20 of the link 18. If a greater ratio than unity is desired, it can be obtained by setting the mechanism so that the pivot point 31 is to the right of the vertical axis 43 in the fully-extended position of the servo 35 shown in FIG. 2. In this position of the link 30, the pivot point 44 will travel farther than the pivot 20, resulting in a ratio greater than unity.

Figure 4:
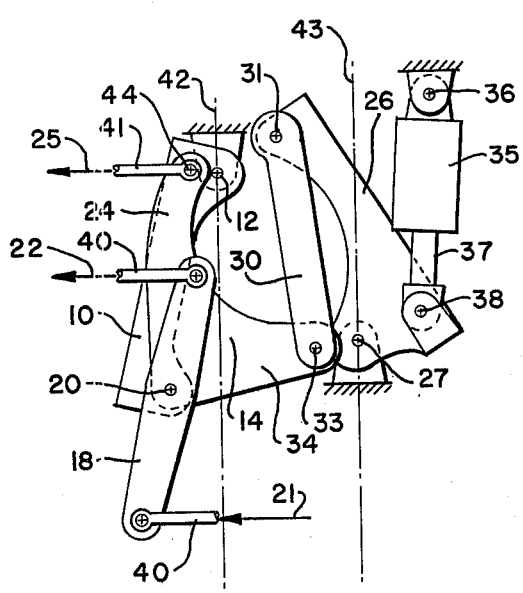

The ratio of output-to-input signals is adjusted by the servo 35 which may be controlled manually or in response to change in any desired condition, such as air speed in the aircraft application previously described. FIG. 4 shows the position of the parts when the piston of the servo 35 has been partially retracted to a position providing a ratio of 0.5. In this position, the crank 26 has been rotated about its pivot point 27 to a position such that the link 30 is moved to the left from the vertical axis 43 to carry its pivot 31 downward and past the pivot 33 of the crank 14. This further limits movement of the crank 14 and reduces its rotation relative to the link 10 as the input member 18 moves to the left. That is, the pivot 33 is constrained to move in an arc about the pivot 31, and since the pivot 31 has been moved to the left of the pivot 33, movement of the crank arm 24 relative to the axis 42 is correspondingly limited. Horizontal travel of the crank arm 24 is thus reduces to that it moves only to a position shown. Comparison of FIG. 3 and FIG. 4 shows that the movement of point 44 in FIG. 4 is half the corresponding movement in FIG. 3 for the same movement of the link 18, so that the ratio of output-to-input signals is 0.5. It will be evident that this ratio can be smoothly and continuously adjusted to any value within its range by extension or retraction of the servo 35.

Figure 5:
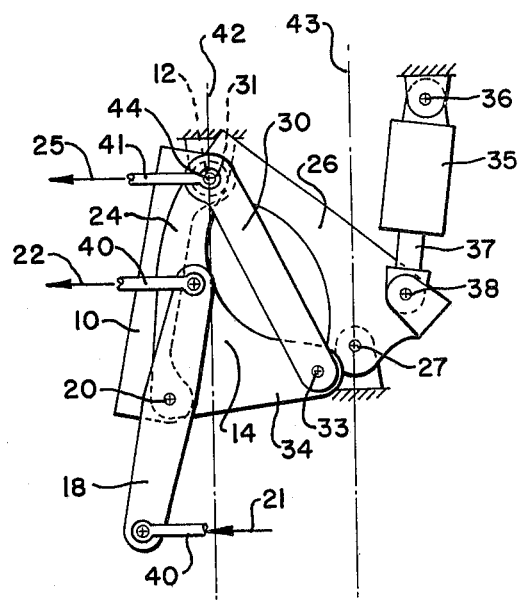

As previously stated, a lockout position, or zero ratio position, is also required and this is illustrated in FIG. 5. In this position, the servo 35 is fully retracted which causes the crank 26 to rotate about its pivot 27 to a position in which the pivot 31 of the link 30 is in alignment with the pivot 12 of the link 10 at the point indicated at 45 in FIG. 1. In this position, movement of point 44 on crank arm 24 away from the vertical axis is prevented, and movement of the input link 18 results only in rotation of the crank 14 about point 44, which is aligned with the pivot axis 12 and pivot axis 31, resulting in zero motion of the output member 41. In this position, therefore, the ratio is zero and the mechanism is locked out since no output signal can result when input signals are applied.

Figure 6:
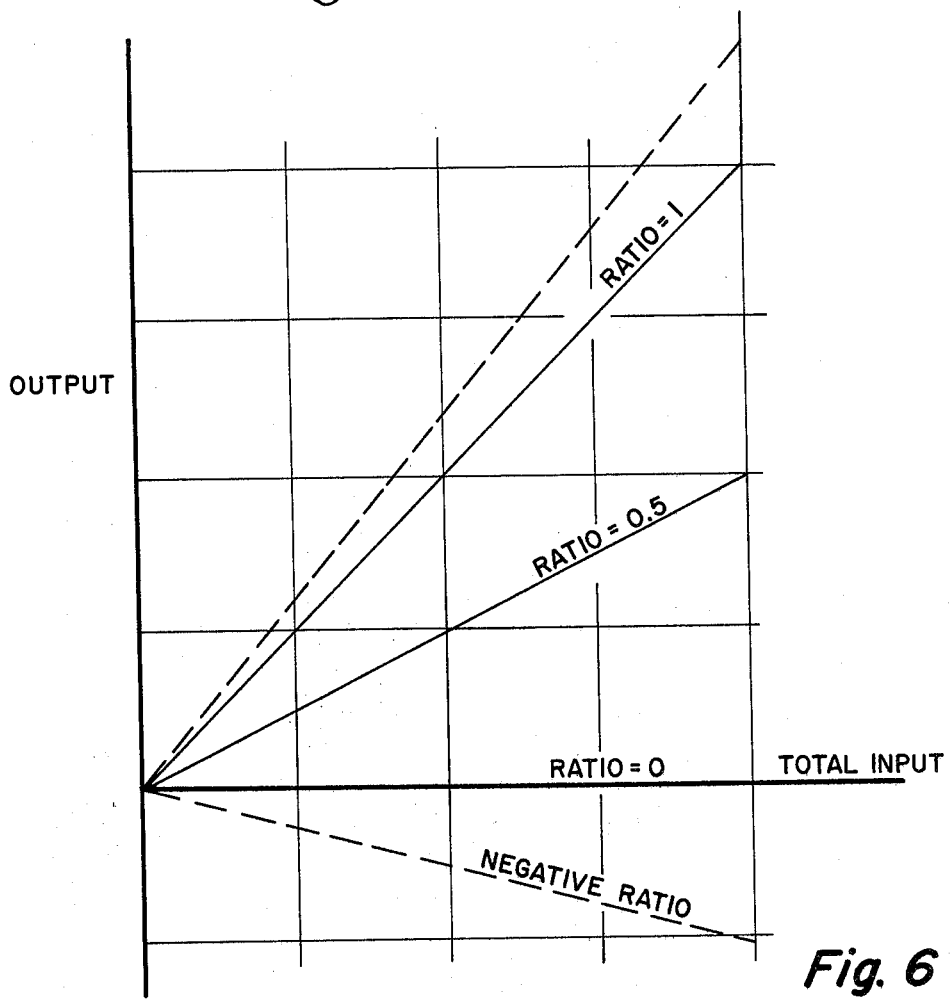
FIG. 6 is a diagram illustrating the effect of adjustment of the ratio.

The operation of the mechanism is further shown in the diagram of FIG. 6. When the ratio is 1.0, as illustrated in FIGS. 2 and 3, a 1:1 relation exists between the output signal and the combined input signals, as shown by the upper solid curve. As the ratio is reduced by retracting the servo 35, the slope of the curve decreases. At the position shown in FIG. 4, for example, the ratio has been reduced to 0.5 and the curve of output against input is as shown in FIG. 6. Further reduction in the ratio further reduces the slope and when the position of FIG. 5 is reached, the ratio becomes zero and no output signal occurs for any input signal. Thus, the required characteristics previously discussed have been obtained since the mechanical input signals are combined to produce an output signal, and the ratio of output-to-input is smoothly and continuously adjustable over the entire range down to zero ratio or lockout.

If a ratio greater than unity is desired, as shown by the upper dashed curve of FIG. 6, it can easily be attained by proper adjustment or design of the mechanism as previously explained. It should also be noted that, if desired, the mechanism could be designed to provide a negative ratio, as shown by the lower dashed curve of FIG. 6. This would require further retraction of the servo 35 beyond the position shown in FIG. 5 to cause the crank 26 to move the upper end of the link 30 to the left of the vertical axis 42. This will cause the crank arm 24 to move to the right in response to input signals such as shown in the drawing, and thus results in a negative ratio. That is, the direction of the output signal reverses and becomes opposite to the direction of the input signals. Such an arrangement may be desired for some applications.

It should now be apparent that a ratio changing mechanism has been provided which has many advantages, particularly for use in aircraft control systems as previously described. The new mechanism provides for the application of two or more mechanical input signals, which may be either cumulative or differential, and provides a generally parallel output signal with an adjustable ratio of outout-to-input extending down to zero output or lockout and, if desired, to negative ratios. The ratio is smoothly and continuously adjustable and the adjustment can be performed automatically in response to air speed, or other quantity, and with no output when the input is zero. A mechanism is thus provided which meets all the desirable requirements discussed above and which is of relatively simple construction.

We claim as our invention:

1. A ratio changing mechanism for combining mechanical input signals, said mechanism comprising a first link having one end pivotally mounted on a fixed support, a first crank member having a pivot point mounted on the other end of said first link and having two arms, a second link pivotally mounted on the pivot point of said first crank member and adapted to have said mechanical input signals applied thereto, means for transmitting an output signal from one of said arms of the first crank member, a second crank member having a pivot point mounted on a fixed support, a third link having one end pivotally attached to the other arm of the first crank member and the other end pivotally attached to one arm of said second crank member, and means for moving the other arm of the second crank member to adjust the ratio of the output signal to the combined input signals.

2. A mechanism as defined in claim 1 in which said second link is pivotally mounted at a point intermediate its ends, and means for applying an input signal to each end of the second link.

3. A mechanism as defined in claim 1 in which the second crank arm is movable to a position in which the output signal is zero for all input signals.

4. A mechanism as defined in claim 3 in which the output signal becomes zero when the second crank arm is moved to a position such that said other end of the third link is aligned with the pivotal mounting of the first link.

5. A mechanism as defined in claim 4 in which said second crank arm is movable to a position in which the third link is beyond said aligned position to cause said ratio of the output signal to the input signals to become negative.

* * * * *